United States Patent Office 2,823,192
Patented Feb. 11, 1958

2,823,192

POLYVINYL CHLORIDE RESIN PLASTICIZED WITH TRIETHYLENE GLYCOL DI-META-TOLUATE

William E. Elwell, Huntington, N. Y., and Judson C. Butler, El Cerrito, Calif., assignors to California Research Corporation, San Francisco, Calif., a corporation of Delaware No Drawing. Application April 26, 1954
Serial No. 425,740

1 Claim. (Cl. 260—31.4)

This invention relates to esters of toluic acid and, more particularly, to glycol and polyglycol di-esters of toluic acid suitable as plasticizers for resins of the type such as polyvinyl chloride and its copolymers.

Resins such as polyvinyl chloride and its copolymers are widely employed in the plastics industry. Such resins are generally hard and brittle in nature and require the addition of substantial proportions of plasticizing agents to improve their workability. Since some of the plasticizer is ordinarily retained in the plastic product, it is desirable that it possess certain characteristics. Among these desirable characteristics are the ability of a plasticizer to impart low temperature flexibility to the product. The plasticizer must also be of low volatility to prevent its loss by evaporation. It is also desirable that the plasticizer be one which does not allow the finished product to become hard and brittle and easily fractured.

We have discovered a novel class of glycol and polyoxyalkylene glycol di-toluate esters derived from meta-toluic acid and toluic acid mixtures containing at least 50% meta-toluic acid which are very excellent plasticizers for resins such as polyvinyl chloride and its copolymers.

The novel di-meta toluate esters of our invention are generally characterized by the following structural formula

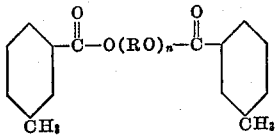

wherein R is an alkylene group of from 2 to 6 carbon atoms and n is an integer of from 1 to 4.

The foregoing di-esters are readily prepared by various means known to the art. One suitable method is by direct esterification of the glycol or polyoxyalkylene glycol with a slight excess of the meta-toluic acid, or with an isomeric mixture thereof containing at least 50% meta-toluic acid. If desired, the esterification may be carried out in the presence of an acidic catalyst such as para-toluene sulfonic acid. The water formed during the reaction is readily removed by distillation leaving the crude di-ester product. The crude product may then be purified by various means such as washing and drying, redistilling, percolating through clay, as well as others, to lower the neutralization number and improve the color.

Glycols useful in the preparation of the novel class of di-toluate esters in accordance with our discovery include ethylene glycol, trimethylene glycol, 1,4-butane diol, 1,5-pentane diol, etc.; glycols, such as 2-methyl 1,3-pentane diol or polyhydric materials such as glycerine or pentaerythritol; and the polyoxyalkylene glycols illustrated by di-ethylene glycol, tri-ethylene glycol, tetraethylene glycol, as well as others.

Various mixtures of toluic acids containing at least 5% meta-toluic acid may be employed in the esterification of the above glycols and polyoxyalkylene glycols to produce our novel compounds. Both ortho- and para-toluic acids may be present in combined amounts not exceeding 50% of the toluic acid mixture, or only one of the ortho-paraisomers may be present in such proportions. The presence of minor amounts of impurities such as benzoic acid in the toluic acid mixture does not render it unsuitable for use in the preparation of the di-esters according to this invention.

The following examples are illustrative of the invention.

EXAMPLE 1—PREPARATION OF TRIETHYLENE GLYCOL DI-META-TOLUATE 2.2 mols of meta-toluic acid were mixed with 1.0 mols of triethylene glycol in a reaction vessel equipped with an atmospheric condenser. 1.2 g. of toluene sulfonic acid catalyst were then added. The reaction mixture was heated to a temperature of 190 to 210° C. for a period of 3.5 hours. During the reaction the water was formed and was removed by allowing it to distill over from the reaction vessel. At completion of the reaction the product was washed free of unreacted acid, dried, and distilled. The distilled product was then percolated through clay to give a light, straw-colored liquid which was characterized by a saponification number of 291, comparable to a theoretical of 290.5. The product boiled between 255 and 265° C. at 0.8 mm. pressure. It had a viscosity of 226 SSU at 100° F.

EXAMPLE 2—PREPARATION OF TRIETHYLENE GLYCOL DI-MIXED TOLUATES 3.2 mols of mixed toluic acids consisting of 6% by weight of ortho-toluic acid, 61% meta-toluic acid, 25% para-toluic acid, 3% benzoic acid and 5% non-acidic inert materials were mixed with 1.45 mols of triethylene glycol and 4 g. of toluene sulfonic acid as the catalyst. 400 g. of xylene were added as a diluent. The reaction temperature was maintained at 155° C. for a period of 12 hours and the water formed in the reaction was removed by azeotropic distillation with the xylene. The product was then washed free of unreacted acid, dried, and distilled to remove the xylene and the lower boiling unreacted materials such as the non-acidic inert materials which were present in the crude meta-toluic acid mixture. The final product was a yellow-colored oily material having a saponification number of 283. It was further characterized by a boiling range of 100 to 260° C. at 1.2 mm. pressure and had a viscosity of 199 SSU at 100° F.

Triethylene glycol di-ortho-toluate and triethylene glycol di-para-toluate were also prepared in the manner of the foregoing examples. The products derived thereby were closely similar in physical characteristics to the products of the examples. Di-mixed toluates of 1,4-butane diol and 1,5-pentane diol were also prepared by the same methods using mixed toluic acids as in Example 2.

The above products were tested as plasticizers by mixing them with a polyvinyl chloride unplasticized resin commercially known as Geon 101. 40% of the ester to be tested was incorporated with about 60% of the resin by mixing on a rubber mill. The mixture of resin and plasticizer was then pressed between heated platens for about 5 minutes to form the test sheet. The samples were then allowed to cool.

The volatility of the plasticizers was determined by cutting strips from the pressed sheets and placing them in an oven at 105° C. for 48 hours. The volatility of the sample was shown by the percent loss in weight.

The hardness of the plastic samples was tested by means of a Rex Model A hardness tester at a temperature of 75° F., using the method described in ASTM Method D-676-44-T. The test results were obtained in Shore hardness units.

The low temperature flexibility of the samples was determined by the method of Clash and Berg described in Industrial and Engineering Chemistry, vol. 34 (1942), pages 1218 to 22. The temperature was recorded at which a sample of the plastic containing plasticizer twisted 200 degrees in a 5-second period.

In addition to the foregoing physical tests, the plastic products were appraised as to compatibility of plasticizer and resin. A plasticizer was classed as incompatible if it exuded from the plastic surface within 30 days of preparation. Compatible plasticizers produced a clear plastic product.

The results of the tests on the products are set out in the following table:

*Table I—Plasticizers in polyvinyl chloride resin*

| Ester | Shore Hardness | Low Temperature Flexibility, °C. | Volatility, Percent Loss in 24 hrs. | |
|---|---|---|---|---|
| Triethylene glycol di-o-toluate. | 82 | −17.7 | 9.7 | Incompatible. |
| Triethylene glycol di-m-toluate. | 82 | −16.0 | 2.0 | Clear and compatible. |
| Triethylene glycol di-p-toluate. | 87 | −8.5 | 10.2 | Incompatible. |
| Triethylene glycol di-mixed toluate (Example 2). | 82 | −12.6 | 3.6 | Clear and compatible. |
| 1,5-pentane di-mixed-toluate (61% meta as in Example 2). | 86 | −12.0 | 5.0 | Do. |
| 1,4-butane di-mixed-toluate (61% meta as in Example 2). | 84 | −10.0 | 9.0 | Do. |
| Triethylene glycol di-octoate. | 77 | −46 | 42.0 | Do. |

In the above table test data obtained using a commercially accepted plasticizer, namely, a triethylene glycol di-octoate derived from 2-ethylhexanoic acid, has been included for the purpose of comparison. It will be noted from the results that although the glycol and polyoxy- alkylene glycol di-toluate esters are in general very good plasticizers and much less volatile than the triethylene glycol dioctoate, the di-meta-toluates and di-toluates derived from mixtures containing at least 50% meta-toluic acid are decidedly superior to the di-ortho-toluates and di-para-toluates. The di-meta-toluates exhibit the lowest flex temperatures and volatility loss and compare favorably in having a low Shore hardness. Another important advantage which distinguishes the di-meta-toluates and mixed di-meta-toluates over the di-ortho-toluate and di-para-toluate esters is their compatibility with the plastic to produce a clear, transparent product. The di-meta-toluate products are characterized by their retention in the plastic, whereas the di-ortho-toluates and di-para-toluates are found to exude over a period of time and leave an undesirable oily film on the plastic surface.

Employing as plasticizing agent triethylene di-m-toluate, clear and compatible resins were also obtained in the case of a commercially available unplasticized polyvinyl chloride-acetate copolymer, known in the trade as Bakelite VYHH, and Bakelite VYNW, a commercially available unplasticized polyvinyl chloride homopolymer. In each case the volatility loss was of the order of 2 percent.

This application is a continuation-in-part of our co-pending application Serial No. 202,823, filed December 26, 1950, now abandoned.

In view of the foregoing disclosure, variations and modifications of the invention will be apparent to those skilled in the art. All such variations and modifications as come within the scope of the appended claim are contemplated by the invention.

We claim:

Polyvinyl chloride resin plasticized with a plasticizer consisting essentially of triethylene glycol di-meta-toluate.

References Cited in the file of this patent

Industrial and Eng. Chemistry, article by Emerson et al., pages 1431–1433, volume 42, No. 7, July 1950; received for publication January 23, 1950.